April 22, 1958 L. O. HEDBLOM 2,831,511
AUTOMATIC CHAIN SAW
Filed Dec. 8, 1954 4 Sheets-Sheet 3

INVENTOR.
LARS O. HEDBLOM.
BY
Robert C. Sloman
ATTORNEY.

April 22, 1958     L. O. HEDBLOM     2,831,511
AUTOMATIC CHAIN SAW
Filed Dec. 8, 1954     4 Sheets-Sheet 4
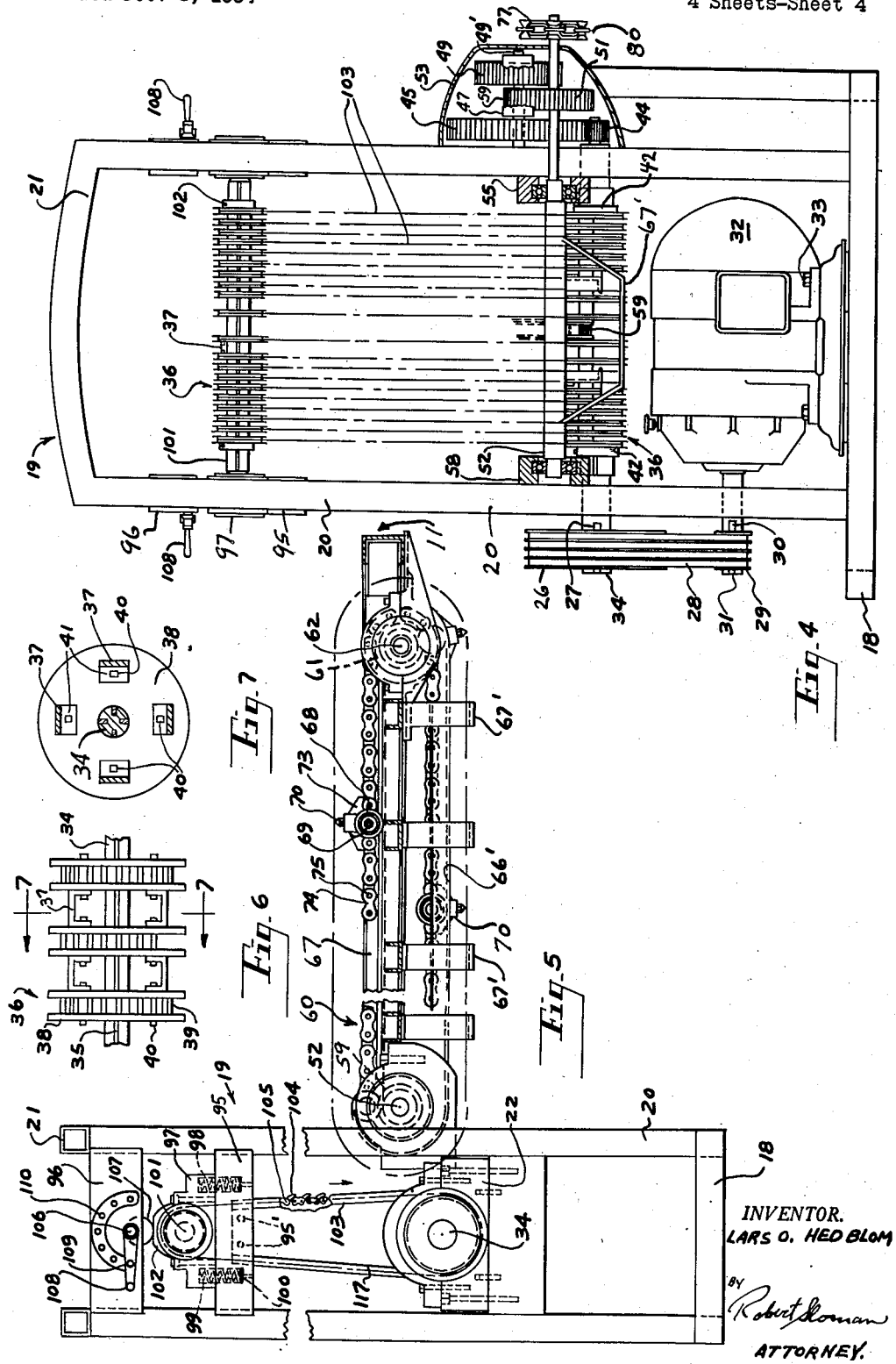
INVENTOR.
LARS O. HEDBLOM
BY
Robert Roman
ATTORNEY.

United States Patent Office 2,831,511
Patented Apr. 22, 1958

2,831,511

AUTOMATIC CHAIN SAW

Lars O. Hedblom, Detroit, Mich.

Application December 8, 1954, Serial No. 473,799

4 Claims. (Cl. 143—32)

This invention relates to the milling of logs into lumber and more particularly to a novel automatic chain saw construction.

Heretofore in the existing method for milling logs it required considerable unnecessary time and effort wherein the log was rotated three times on the mill for cleaning off the sides and providing a rectangular block from which lumber could be milled. One disadvantage of the old method was that considerable lumber was wasted.

It is the object of the present invention to provide a novel automatic saw construction which is portable and which may be moved to any location and which will more effectively cut up logs to obtain the maximum amount of lumber and in a manner which does not require any rotation of the log.

It is the further object of the present saw mill construction to provide a set of newly designed cutters sufficient in number to make any number of cuts of boards or planks with the said cutters being easily spaced to the desired thickness of board, and which in the operation of the machine will mill a complete log in a single operation or pass of the said log with respect to the cutters.

It is the further object of the present invention to provide a more efficient log mill which is provided with a suitable conveyor mechanism for carrying and feeding the log past a series of upright laterally spaced chain saws for cutting up the log into the desired planks, and in conjunction with a second conveyor aligned with the first conveyor for transmitting the cut boards from the machine.

It is the further object of the present invention to provide a novel power transmission within the log mill whereby the driving mechanism for the chain saws will effectively control at a reduced velocity the movement of the log and plank conveyors.

It is the further object of the present invention to provide a novel conveyor mechanism which includes a novel log carriage construction.

These and other objects will be seen from the following specification and claims in conjunction with the appended drawings, in which:

Fig. 4 is a fragmentary section taken on line 4—4 of Fig. 3, and partially sectioned for illustration.

Fig. 5 is a fragmentary side elevational view of a portion of the log mill shown in Fig. 3, and partially sectioned for illustration.

Fig. 6 is a fragmentary elevational view of the sprocket construction for driving the chain saws and illustrating their spacer construction.

Fig. 7 is a section taken on line 7—7 of Fig. 6.

Figure 1:
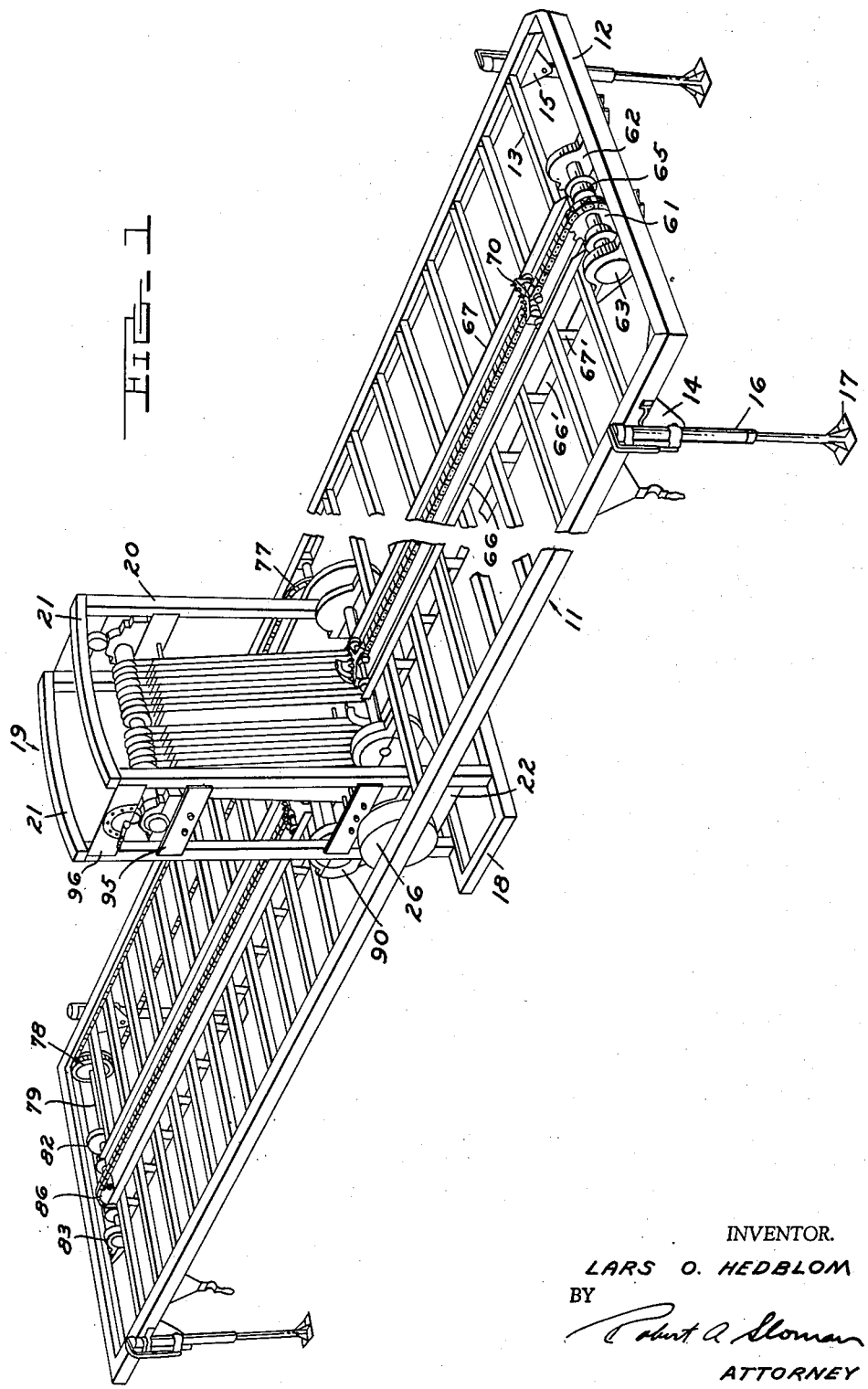
Fig. 1 is a perspective view of the present automatic log mill construction.

It will be understood that the above drawings illustrate merely a preferred embodiment of the invention and that other embodiments are contemplated within the scope of the claims hereafter set forth.

Referring to the drawings, the present automatic chain saw or log mill construction includes a hollow horizontally disposed rectangular frame 11, which consists of a series of inwardly directed channel elements 12 of U-shape in cross section. There are also provided interconnecting the longitudinal members of said frame a series of longitudinally spaced cross braces 13 which are also of U-shape in cross section, and which extend upwardly and whose ends are fixedly secured to the said frame to provide a rigid unit.

Adjacent each of the corners of the frame there is provided a depending mounting bracket 14 and connected thereto as at 15 is a supporting jack construction 16 having a foot construction 17 at its lower end. These jacks cooperate with the central saw supporting frame 19 which is provisioned intermediate the ends of frame 11 and which includes a rectangular ground engaging support 18 shown in Fig. 1.

The framing for the saw mechanism also includes the 4 upright corner posts 20, and the interconnecting top frame elements 21 as well as the cross pieces 95 and 96 hereafter described.

Adjacent the support 18 and interposed between the uprights 20 upon opposite sides of the frame 19, there are provided a pair of bearing blocks 22 which are secured to the uprights 20 as at 23, and which support the bearings 24 for receiving and journaling the power-driven shaft 34, and which carries pulley 26 keyed thereto at 27 as shown in Fig. 4.

A series of belts 28 interconnect pulley 26 with the drive-pulley 29 which is keyed as at 30 to the power shaft 31 of electric motor 32, which is suitably bolted to the frame as at 33.

The sprocket shaft 34 has a series of longitudinal splines or grooves 35 formed therein over which are immovably secured in adjusted spaced relation a series of chain driving sprocket assemblies 36 with suitable and variable spacers 37 interposed therebetween, as more fully illustrated on an enlarged scale in Figs. 6 and 7.

In Figs. 6 and 7, the assembly 36 includes a pair of spaced circular discs 38 which have central aligned apertures for receiving portions of shaft 34, and which have radial projections or splines which cooperate with the spline openings 35 for immovably securing the said discs for rotation in unison with shaft 34.

Interposed between each pair of discs 38 there is provided a sprocket gear 39 which is similarly apertured to receive said shaft and which also has similar splines for locking engagement with rotative shaft 34.

Sprocket gear 39 is of less diameter than discs 38 to thereby provide the opposed guides for retaining the chain saws 103 and their sprocket chain construction with respect to the corresponding sprocket gear and in driven relation therewith. In completing the assembly of a particular sprocket gear and disc arrangement, there are provided between a pair of said sprocket gear assemblies a series of annularly spaced spacers 37 which are of substantially U-shape in cross section as shown in Figs. 6 and 7. These spacers are interposed between a pair of sprocket gear assemblies and their depending flanges 41 are secured to the corresponding outer surface of discs 38 by the transverse bolts 40, which project through the spacers, as well as the discs 38 and the sprocket gear 36, thereby completing the disc and gear assembly and at the same time immovably securing one assembly with respect to an adjacent assembly, and completing the multiple chain saw drive construction.

It is contemplated that the spacing between the chain saws will, of course, be varied depending upon the thickness of board to be cut. Therefore, the spacers 37 are provided in different lengths between sprocket gear assemblies in the manner desired.

At opposite ends of the series of sprocket gear assemblies which are immovably secured together and upon shaft 34 there are provided a pair of split collars 42, whose projecting wings are brought together and tightly secured by the bolts 43 to thereby retain the respective sprocket gear assemblies against longitudinal movement upon shaft 34.

Figure 3:
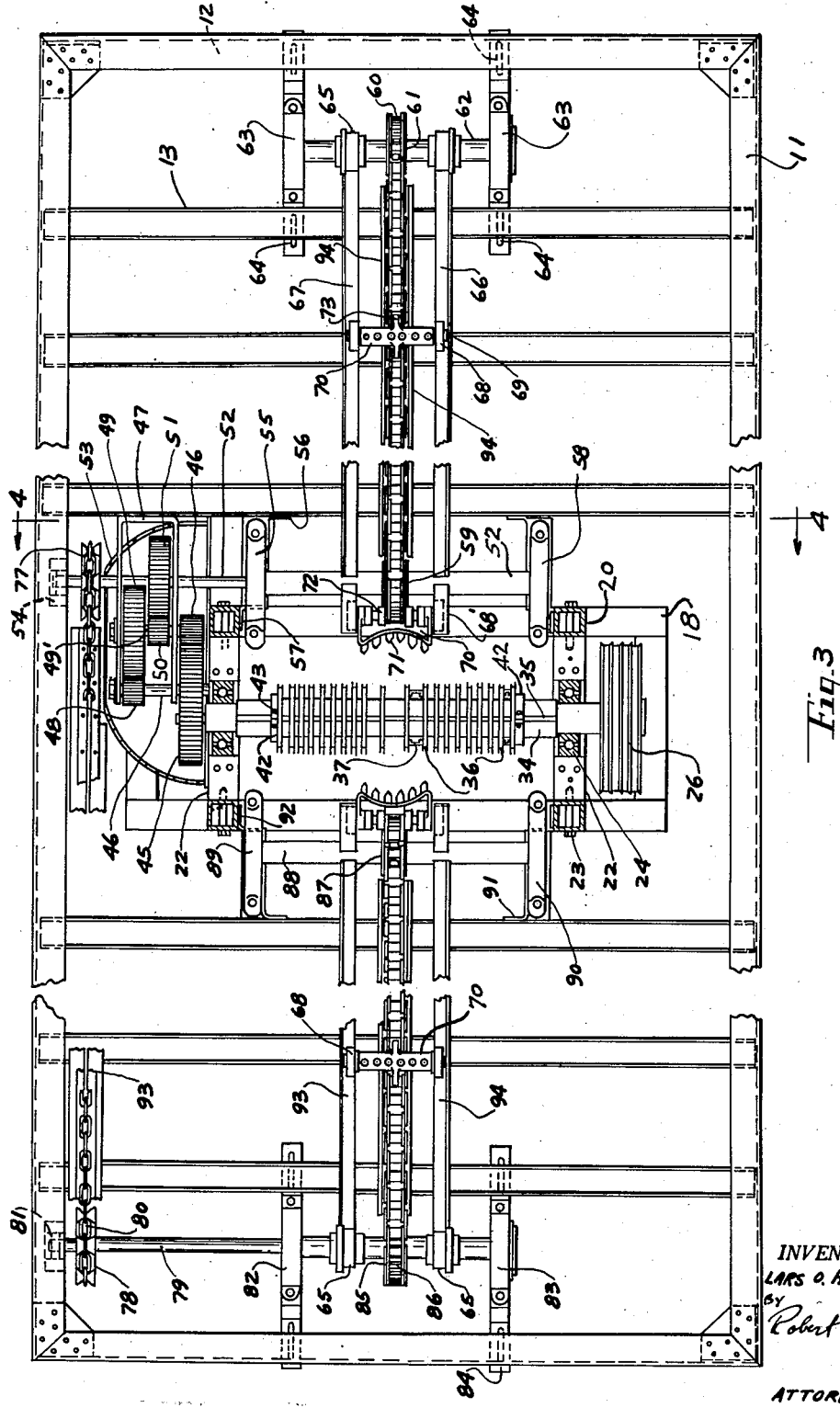
Fig. 3 is a partially cut away and fragmentary plan view of the present log mill, partially sectioned for illustration.

Referring to Figs. 3 and 4, shaft 34 carries at one end and has secured thereto the pinion 44, which is enmeshed with the enlarged gear 45 arranged directly above and within the gear housing 53. Gear 45 is secured upon one end of shaft 46, which is journaled through the U-shaped support frame 47. Shaft 46 also carries a small pinion 48, which is secured thereto and which is enmeshed with the enlarged gear 49 carried on shaft 49' within frame 47. This latter shaft also carries a small pinion 50 enmeshed with gear 51 on elongated shaft 52, one end of which is supported in the bearing 54 within frame 11. Shaft 52 is supported intermediate its ends through the bearing assembly 55 which is anchored as at 56 to the adjacent cross brace 13, and is also anchored at its opposite side to an adjacent frame upright as at 57, particularly shown in Fig. 3.

Shaft 52 at its opposite end is journaled and supported by a similar bearing assembly 58 which corresponds to bearing assembly 55 in construction, which is also mounted and secured within the frame in the manner above described in connection with bearing assembly 55.

Shaft 52 has keyed thereto a sprocket gear 59 which is interconnected with a second sprocket gear 61 adjacent one end of frame 11 by the continuous sprocket chain 60.

Sprocket gear 61 is suitably keyed or secured upon transverse shaft 62 whose respective ends are supported and journaled within the bearing assemblies 63 which are interposed within frame 11 and secured thereto as at points 64.

A pair of flanged roller guides 65 are secured upon shaft 62 in spaced relation adapted for cooperative engagement by carriage rollers 68 in the manner hereinafter described.

Interposed between shaft 62 and shaft 52 are a pair of parallel spaced elongated roller supporting flanges 66 and 67 whose supporting surfaces are substantially coplanar with the top edges of the guides 65.

There are provided in conjunction with the sprocket chain 60, which is illustrated fragmentarily, spaced log supporting carriers 70 which have a transverse shaft 69 extending longitudinally therethrough, which shaft is centrally projected through the corresponding and adjacent pivotal link connections of sprocket chain 60 for movement in unison therewith.

Rollers 68 are journaled upon the outer ends of shaft 69 and cooperatively engage the channel members 66 and 67 to provide a moving support for taking a portion of the load of the log which would span a pair of such carriages 70.

Carriage 70 as shown in Fig. 3 is concave throughout its upper surface to correspond to the general shape of a log and projecting therefrom are a series of spaced log clamp pins 71, whose pointed ends are also arranged in the form of an arc for effectively gripping a portion of the log. Spacers 72 in the shape of rollers are also additionally mounted upon the short shafts 69 of said carriages and are adapted for contact and supporting engagement with the elongated platform 94 which is arranged directly below the top portion of sprocket chain 60 to provide an additional support therefor. As shown in Fig. 1, adjacent the shaft 69, for each of the carriages 70 and arranged forwardly and rearwardly thereof, there are provided a second set of small supporting rollers 76 which are suitably secured upon the transverse pins extending through the apertures at the one ends of the chain links 74, such as the pin 75 shown in Fig. 5. However, the pins which support rollers 76 would normally be longer than the standard pin 75 for the said conveyor chain. These rollers 76 also supportably engage the platform 94 to provide additional support for carriages 70 and any load mounted thereon.

As shown in Figs. 3 and 5, there are also provided intermediate the ends of carriage 70 a pair of oppositely arranged triangularly shaped arms 73 which extend longitudinally of the said carriage and are adapted to cooperatively bear against the top surfaces of adjacent portions of the conveyor chain 60, to prevent tilting of carriages 70 during their traverse over supporting channels 66 and 67.

The flanged guide 65 on shaft 62 cooperatively receive carriage rollers 68 as they traverse around one end of their return movement. Adjacent one of the ends of channels 66 and 67 there are provided a pair of semi-circular channel guides 68', which are also adapted to receive rollers 68 for guiding the same onto the return supporting flanged guides 66' shown in Fig. 5. Guides 66' are supported below cross supports 13 by a series of substantially U-shaped brackets 67'.

Sprocket drive shaft 52 adjacent frame 11 and the transmission cover 53 has secured thereon the sprocket gear 77 which is interconnected with a second sprocket gear 78 adjacent the far end of frame 11 by the sprocket chain or link chain 80, illustrated in Fig. 3, which chain is guidably supported intermediate its ends upon the horizontal platform 93. Sprocket gear 78, which may be in the form of a pulley construction, is secured upon the transverse shaft 79, one end of which is journaled as at 81 upon frame 11. Intermediate the ends of shaft 79 the same is journaled and supported within the bearing assembly 82 and at its opposite end within the bearing assembly 83. Both said bearing assemblies are similar to bearing assembly 63 at the opposite end of said frame 11, and are effectively secured to portions of the frame and adjacent cross member 13 as by the fasteners 84.

Intermediate bearing assemblies and supports 82 and 83, the said shaft 79 carries a sprocket gear 85 which is suitably secured thereto and which is enmeshed with sprocket chain 86. Said chain at its opposite end extends over and is enmeshed with sprocket gear 87 secured to the transverse shaft 88, the opposite ends of which are supportably journaled within the bearing assemblies 89 and 90.

Said bearing assemblies are anchored to the cross pieces 13 as at 91, and at their opposite ends are anchored as at 92 to the frame uprights 20.

This conveyor chain 86 also has secured thereto in longitudinally spaced relation throughout its length a series of spaced carriages 70, the same as those above described and which are adapted for transporting cut up logs to the far end of the frame 11. These carriages also have the additional supporting rollers 68 upon their opposite ends which are supportably received upon the parallel spaced channel elements 93 and 94 carried by the cross braces 13. Furthermore, shaft 79 also carries a pair of annularly flanged guides 65 over which rollers 68 move towards their return flight towards shaft 88.

Referring to Figs. 1 and 5, the central saw frame structure 19 includes the cross supports 95 upon opposite sides thereof, which are interconnected by the cross braces 95', Fig. 1. The cross plates 95 are in the form of a hollow box construction overlapping the opposite sides of the upright supports 20. These box constructions support the pair of bearing blocks 97 which are adapted for vertical movements therein and which are supported by the coiled springs 98 whose upper ends are nested within undercut recesses 99 within bearing blocks 97. The lower ends of said springs are supported upon the adjustable supports 100 within the bottom of the bearing supporting boxes 95. The upper transverse saw supporting shaft 101 is journaled through the bearings within bearing blocks 97, said shaft being similarly formed with elongated spline openings, the same as the lower saw driving shaft 34. There is also mounted upon shaft 101 a series of sprocket gear and disc assemblies 36 corresponding to the assemblies upon lower shaft 34 and between which extend the series of upright parallel horizontally spaced continuous sprocket chain saws 103, which have the saw teeth 104 pivotally connected thereto as at 105.

There is provided upon the central frame structure 19 a means for adjusting the center distances between the two shafts 34 and 101. For this purpose there are mounted upon each of the top cross plates 96 a manually controlled adjusting mechanism which includes the rotatable shafts 106, journaled through plates 96 and which carry the eccentrics 107 adapted for operative engagement with the top surface of the pressure plates 102 upon each of the bearing assemblies 97. The outer end of each of the shafts 106 carries a lever arm with projecting handle 108 for effecting rotation of shaft 106. There are provided a series of notches 110 adapted to cooperatively and retainingly receive the detents 109 carried upon the inner surface of each of the levers 108 for effectively securing the same in the desired position of rotated adjustment. It is apparent that the eccentrics 107 upon rotation will effect vertical adjustments of the bearing block 97 in conjunction with the functioning of the expansion springs 98 to thereby regulate the tension in the chain saws 103. It is noted from Fig. 1 that there is of course a separate manual control upon each side of frame 19 for this purpose.

Figure 2:
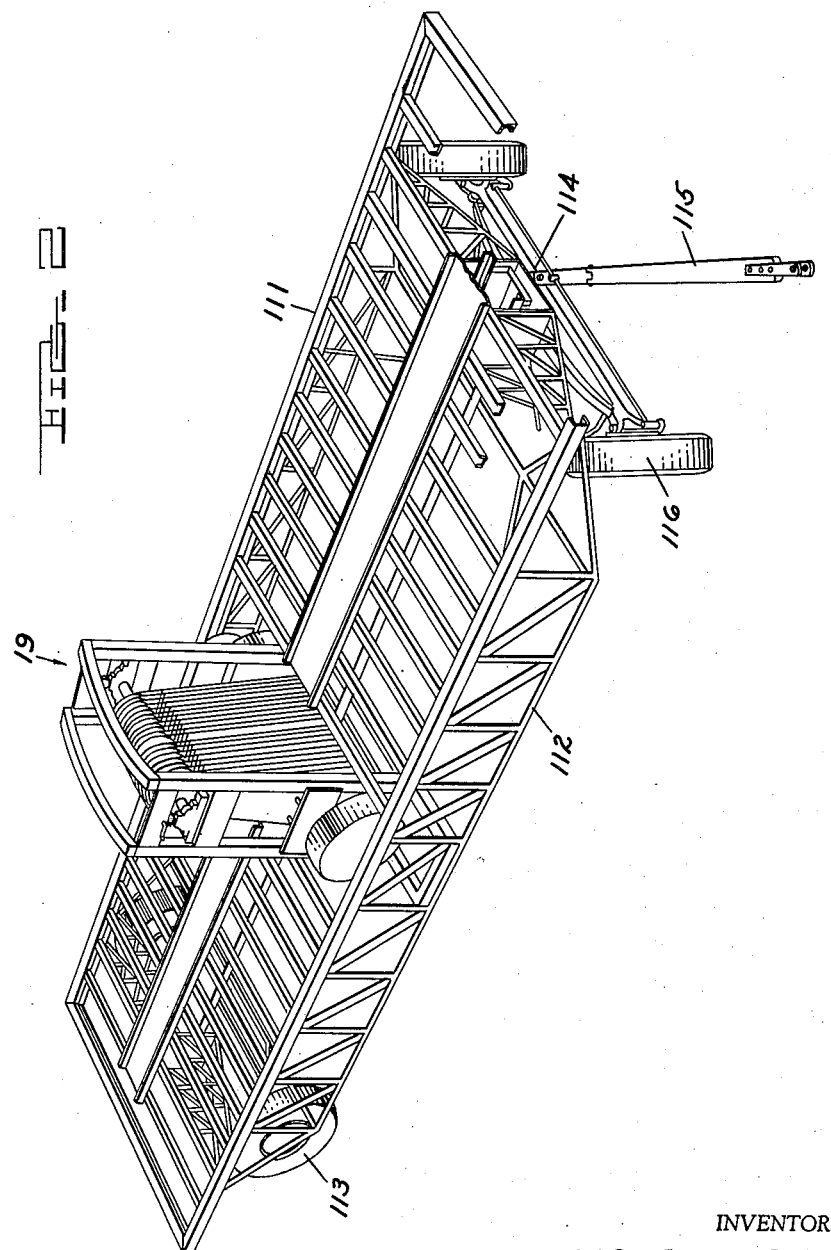
Fig. 2 is a perspective view illustrating the present mill as mounted on wheels.

Fig. 2 in the drawings illustrates only a slight variation of the automatic chain saw shown in Fig. 1 in that the device of Fig. 2 may be moved about on wheels. This device includes the hollow elongated rectangular frame 111 and arranged centrally thereof the upright saw frame 19, the same as the corresponding frame in Fig. 1, and which mounts therein the series of upright parallel spaced chain saws hereinabove described.

Depending from opposite sides of frame 11 is a reinforcing truss formation 112, to add rigidity to the frame. There is provided a rear axle for said frame mounting a pair of wheels 113. The front axle includes a steering yoke 114 and a central draw bar 115 for controlling the steering of the front wheels 116 on the front axle.

By this construction it is obvious that the device may be towed to any desired location for use.

The chain saw construction 103 shown in the drawings normally includes a conventional backing plate 117 such as shown in Fig. 5.

Referring to Fig. 1 or Fig. 3, while the jacks 16 and 17 have been shown as one method of supporting frame 11, it is contemplated that these jacks could be replaced by a permanent supporting structure, such as permanent legs, which could be effectively anchored to some portion of a building. Referring to Fig. 2, these same jacks could be applied to respective corners of frame 111 for leveling the same in the woods.

Having described my invention reference should now be had to the following claims for determining the scope thereof.

I claim:

1. An automatic chain saw comprising a hollow longitudinally extending frame adapted for positioning above the ground surface, an upright multiple saw supporting frame arranged centrally within said hollow frame, secured thereto and projecting thereabove, a series of upright power-driven chain saws mounted within said saw frame and lying in parallel spaced planes which extend in the direction of the length of the hollow frame, a transverse drive shaft journaled on said saw frame, a series of spaced sprockets secured thereto operatively engageable with said chain saws, a spaced driven shaft journaled on said saw frame above said drive shaft, a series of spaced sprockets secured thereto supportably engageable with said chain saws, journal supports receiving the ends of said driven shaft yieldably mounted upon opposite sides of said saw frame, rotatable eccentrics on said saw frame downwardly engageable with said journal supports for regulating the spaced relation between said shafts, a series of compressed coiled springs on said saw frame mounting said journal supports, said eccentrics opposing the expansive action of said springs and conveying means on said longitudinal frame for moving an object through said saw frame.

2. The chain saw of claim 1, rotatable stud shafts journaled on said saw frame upon which said eccentrics are secured, and lever arms also on said stud shafts for rotating the same.

3. The chain saw of claim 1, rotatable stud shafts journaled on said saw frame upon which said eccentrics are secured, lever arms also on said stud shafts for rotating the same, cross supports on said saw frame adjacent its upper end journaling said stud shafts there being a series of arcuately spaced depressions formed in each cross support, and a detent carried by said lever arm and removably registerable with said depressions for securing said eccentrics in the desired position of rotated adjustment.

4. An automatic chain saw comprising a hollow longitudinally extending frame adapted for positioning above the ground surface, an upright multiple saw supporting frame arranged centrally within said hollow frame, secured thereto and projecting thereabove, a series of upright power-drive chain saws mounted within said saw frame and lying in parallel spaced planes which extend in the direction of the length of the hollow frame, a transverse drive shaft journaled on said saw frame, a series of spaced sprockets secured thereto operatively engageable with said chain saws, a driven shaft journaled on said saw frame above said drive shaft, a corresponding series of spaced sprockets secured thereto supportably engageable with said saw chains, the sprockets on said drive and driven shafts being aligned for mounting a continuous chain saw assembly, a pair of discs mounted upon opposite sides of each of said sprockets and of a diameter in excess of the sprocket diameter providing retaining guides for the corresponding chain saw, a series of annularly spaced spacers of substantially U-shape between adjacent pairs of sprockets upon a particular shaft, the free ends of said spacers engaging the outer walls of adjacent discs, bolts extending through said free ends, through the sprocket and both of its discs for securing the discs to the sprockets and the spacers to adjacent sprockets, said bolt also extending through and retainingly engaging the corresponding free end of an adjacent aligned spacer upon the opposite side of the particular sprocket to thereby provide a fixed spaced relation between the respective saw assemblies and for securing the said assemblies together as a unit, said spacers being interchangeable for spacers of different length for regulating the spaced relation between adjacent sprockets and longitudinally movable work conveyor means on said longitudinal frame.

References Cited in the file of this patent

UNITED STATES PATENTS

| Number | Name | Date |
|---|---|---|
| 279,780 | Magaw | June 19, 1883 |
| 468,733 | Stinebring | Feb. 9, 1892 |
| 995,833 | Wood | June 20, 1911 |
| 1,043,169 | Tenow et al. | Nov. 5, 1912 |
| 1,123,783 | Muir | Jan. 5, 1915 |
| 1,252,583 | Kellum | Jan. 8, 1918 |
| 1,421,204 | Fritz | June 27, 1922 |
| 2,377,236 | Jackson | May 29, 1945 |
| 2,516,079 | Shortell | July 18, 1950 |
| 2,532,981 | Wolfe | Dec. 5, 1950 |
| 2,563,867 | Rathert et al. | Aug. 14, 1951 |
| 2,654,404 | Neuhauser | Oct. 6, 1953 |
| 2,670,017 | Fiest | Feb. 23, 1954 |
| 2,682,694 | Kemphes | July 6, 1954 |